US011323800B2

(12) United States Patent
Hunt (10) Patent No.: US 11,323,800 B2
(45) Date of Patent: May 3, 2022

(54) ULTRASONIC SPEECH RECOGNITION

(71) Applicant: X Development LLC, Mountain View, CA (US)

(72) Inventor: Thomas Peter Hunt, Oakland, CA (US)

(73) Assignee: X Development LLC, Mountain View, CA (US)

(*) Notice: Subject to any disclaimer, the term of this patent is extended or adjusted under 35 U.S.C. 154(b) by 0 days.

(21) Appl. No.: 16/842,241

(22) Filed: Apr. 7, 2020

(65) Prior Publication Data

US 2020/0344544 A1    Oct. 29, 2020

Related U.S. Application Data

(60) Provisional application No. 62/838,709, filed on Apr. 25, 2019.

(51) Int. Cl.
*G10L 15/28* (2013.01)
*H04R 1/46* (2006.01)

(52) U.S. Cl.
CPC .............. *H04R 1/46* (2013.01); *G10L 15/28* (2013.01)

(58) Field of Classification Search
CPC ................................. H04R 1/46; G10L 15/28
USPC ....................................................... 704/231
See application file for complete search history.

(56) References Cited

U.S. PATENT DOCUMENTS

| | | | | |
|---|---|---|---|---|
| 4,821,326 A | * | 4/1989 | MacLeod | G10L 21/0364 704/258 |
| 8,988,373 B2 | * | 3/2015 | Thorn | G06F 3/011 345/173 |
| 9,911,358 B2 | * | 3/2018 | Ghovanloo | G09B 5/06 |
| 2010/0070268 A1 | * | 3/2010 | Sung | G10L 15/24 704/226 |
| 2011/0213397 A1 | * | 9/2011 | Mathonnet | B06B 1/0284 606/169 |
| 2016/0233966 A1 | * | 8/2016 | Kappus | H04B 11/00 |
| 2017/0123487 A1 | * | 5/2017 | Hazra | G06F 3/017 |

OTHER PUBLICATIONS

E. David, "Signal Theory in Speech Transmission," in IRE Transactions on Circuit Theory, vol. 3, No. 4, pp. 232-244, Dec. 1956, doi: 10.1109/TCT.1956.1086322. (Year: 1956).*

(Continued)

*Primary Examiner* — Bharatkumar S Shah
(74) *Attorney, Agent, or Firm* — Fish & Richardson P.C.

(57) ABSTRACT

Methods, systems, and apparatus, including computer programs encoded on computer storage media, for analyzing ultrasonic signals to recognize mouthed articulations. One of the methods includes generating an ultrasonic carrier signal and coupling the ultrasonic carrier signal to a person's vocal tract. The method includes detecting a modulated ultrasonic signal, the modulated ultrasonic signal corresponding to the ultrasonic carrier signal modulated by the person's vocal tract to include information about articulations mouthed by the person; analyzing, using a data processing apparatus, the modulated ultrasonic signal to recognize the articulations mouthed by the person from the information in the modulated ultrasonic signal; and generating, using the data processing apparatus, an output in response to the recognized articulations.

18 Claims, 7 Drawing Sheets

(56) References Cited

OTHER PUBLICATIONS

M. Castillo, F. Rubio, D. Porras, S. H. Contreras-Ortiz and A. Sepulveda, "A small vocabulary database of ultrasound image sequences of vocal tract dynamics," 2019 XXII Symposium on Image, Signal Processing and Artificial Vision (STSIVA), 2019, pp. 1-5, doi: 10.1109/STSIVA.2019.8730224. (Year: 2019).*

E. David, "Signal Theory in Speech Transmission," in IRE Transactions on Circuit Theory, vol. 3, No. 4, pp. 232-244, Dec. 1956, doi: 10.1109/TCT.1956.1086322. (Year: 1956) (Year: 956).*

E. David, "Signal Theory in Speech Transmission," in IRE Transactions on Circuit Theory, vol. 3, No. 4, pp. 232-244, Dec. 1956, doi: 10.1109/TCT.1956.1086322. (Year: 1956) (Year: 956) (Year: 1956).*

M. Castillo, F. Rubio, D. Porras, S. H. Contreras-Ortiz and A. Sepulveda, "A small vocabulary database of ultrasound image sequences of vocal tract dynamics," 2019 XXII Symposium on Image, Signal Processing and Artificial Vision (STSIVA), 2019, pp. 1-5, doi: 10.1109/STSIVA.2019.8730224. (Year: 2019) (Year: 2019).*

Ahmadi et al., "Linear predictive analysis for ultrasonic speech", Electronic Letters, Mar. 2010, 3 pages.

Ahmadi et al., "The use of low-frequency ultrasonics in speech processing", Signal Processing, 2010, 28 pages.

* cited by examiner

ULTRASONIC SPEECH RECOGNITION

CROSS-REFERENCE TO RELATED APPLICATION

This application claims the benefit of U.S. Application No. 62/838,709, filed Apr. 25, 2019, which is incorporated by reference.

TECHNICAL FIELD

This specification generally relates to speech recognition using ultrasound frequencies.

BACKGROUND

Speech recognition systems can recognize and translate spoken articulations into text. Machine learning methods can be used to improve speech recognition system accuracy.

SUMMARY

This specification describes techniques, methods, and systems for recognizing speech when a user moves his mouth but does not generate an audible sound. Rather, the user's vocal system is used to modulate an ultrasonic signal that is subsequently detected and analyzed to recognize the user's speech. Ultrasonic speech devices that operate this way can be used for communication in noisy environments, such as industrial environments, as well as in any environment when it is undesirable for a user's voice to be overheard. The ultrasonic speech device can also be used by users who are unable to generate audible sounds for normal speech, but are able to move their mouths and/or other portions of their vocal tracts.

In general, ultrasonic speech recognition includes the following processes. The ultrasonic speech device injects ultrasonic energy into a vocal tract. The ultrasonic energy is modulated through vocal tract movement. The ultrasonic speech device extracts the modulated ultrasonic energy and creates an electromagnetic waveform from the modulated ultrasonic energy. The ultrasonic speech device performs classification, e.g., uses algorithms to classify the captured waveform into recognized mouthed articulations, such as phonemes, commands, words, sentences, or other vocal tract movements.

The ultrasonic speech device includes an ultrasound source, an ultrasound microphone, and a data processing system. In some embodiments, the ultrasound source and ultrasound microphone can be the same physical device that alternates between the two tasks. The ultrasound source can be, for example, any appropriate type of transducer capable of producing an ultrasonic carrier signal within an operative frequency band. The ultrasound source produces an ultrasonic signal that is above the standard frequency range of human hearing, e.g., between 20 kilohertz (kHz) and 30 kHz. In some implementations, the ultrasound source can couple the signal to a user's body, for example, a structure of the user's face or throat, to inject the ultrasonic energy into the vocal tract.

The ultrasound microphone can be any appropriate type of microphone that is capable of receiving the frequencies produced by the ultrasound source. The ultrasound microphone can be, for example, a contact microphone, an air microphone, or an in-mouth microphone. In some implementations, the ultrasound microphone can be a microphone integrated with a laptop, telephone, headset, or other device.

The data processing system can include a computer or mobile device, such as a smartphone or a wearable device, having appropriate data processing capabilities for receiving and analyzing an ultrasonic carrier signal in the operative frequency range of the system. The data processing system analyzes the received ultrasonic carrier signal and performs speech recognition. In some implementations, the computing system uses a machine learned method, e.g., a neural network, to recognize articulations based on modulated ultrasonic signals.

The ultrasound source and the ultrasound microphone can each be located sufficiently close to the user's vocal tract to couple the ultrasonic carrier signal from the ultrasound source to the user, and from the user to the ultrasound microphone. For example, the ultrasound source and ultrasound microphone can each be located at or near the mouth or throat. In some implementations, the ultrasound source and ultrasound microphone can both be located inside the user's mouth. In some implementations, the ultrasound source can be located inside the user's mouth, while the ultrasound microphone is located outside the user's mouth. In some implementations, both the ultrasound source and the ultrasound microphone are outside of the user's mouth. For example, the ultrasound source and ultrasound microphone can each be located on or near the surface of the user's face, throat, or another part of a user's body, including the chest and extremities.

In operation, the ultrasound source produces an ultrasonic carrier signal while the user modulates his mouth as in normal speech, without moving air through the voice box. The frequencies of the ultrasonic carrier signal are modulated by the user's vocal tract movement as the ultrasonic carrier signal travels from the ultrasound source to the ultrasound microphone.

The ultrasound microphone sends the received ultrasonic carrier signal to the data processing system. The data processing system analyzes the sound signal and performs speech recognition. The data processing system produces an output. The output can be, for example, a text of the recognized articulations, an audio signal of the recognized articulations, and/or the execution of a command in response to the recognized articulations.

In general, one innovative aspect of the subject matter described in this specification can be embodied in a method that includes generating an ultrasonic carrier signal and coupling the ultrasonic carrier signal to a person's vocal tract. The method includes detecting a modulated ultrasonic signal, the modulated ultrasonic signal corresponding to the ultrasonic carrier signal modulated by the person's vocal tract to include information about articulations mouthed by the person; analyzing, using a data processing apparatus, the modulated ultrasonic signal to recognize the articulations mouthed by the person from the information in the modulated ultrasonic signal; and generating, using the data processing apparatus, an output in response to the recognized articulations.

In general, one innovative aspect of the subject matter described in this specification can be embodied in a system including an ultrasonic transducer module configured to generate an ultrasonic carrier signal and couple the ultrasonic carrier signal to a person's vocal tract and a microphone module configured to be coupled to the person's vocal tract to detect a modulated ultrasonic signal, the modulated ultrasonic signal corresponding to the ultrasonic carrier signal modulated by the person's vocal tract to comprise information about articulations mouthed by the person. The system includes a data processing apparatus in communication with the microphone module programmed to analyze the modulated ultrasonic signal to recognize the articulations mouthed by the person from the information in the modulated ultrasonic signal and generate an output in response to the recognized articulations.

These and other embodiments may each optionally include one or more of the following features. In some implementations, generating the ultrasonic carrier signal includes: receiving, from an electronic device, an electromagnetic waveform; and converting the electromagnetic waveform to the ultrasonic carrier signal.

In some implementations, analyzing the modulated ultrasonic signal includes performing speech recognition on the articulations mouthed by the person.

In some implementations, the articulations mouthed by the person include one or more of a phoneme, word, command, phrase, sentence, or non-word articulation.

In some implementations, detecting the modulated ultrasonic signal includes: receiving acoustic energy; and filtering the received acoustic energy to remove portions of the received acoustic energy at frequencies outside of an operative frequency band of the ultrasonic carrier signal.

In some implementations, generating the output includes generating a text of the recognized articulations.

In some implementations, generating the output includes generating an audio signal of the recognized articulations.

In some implementations, generating the output includes executing a command in response to the recognized articulations.

In some implementations, generating the output includes generating output data indicating a prosody of the recognized articulations.

In some implementations, a frequency of the ultrasonic carrier signal varies according to a transmit time of the ultrasonic carrier signal. In these implementations, detecting the modulated ultrasonic signal includes receiving acoustic energy at a receiving time; and filtering the acoustic energy to remove portions of the acoustic energy having a frequency outside of a range of frequencies. The range of frequencies accords with a range of transmit times, each of the transmit times being approximately a time interval prior to the receiving time. The time interval is a travel time of the ultrasonic carrier signal from the ultrasonic transducer module to the microphone module through the vocal tract.

In some implementations, detecting the modulated ultrasonic signal includes: receiving acoustic energy; and filtering the received acoustic energy to remove portions of the received acoustic energy at frequencies outside of an operative frequency band of the ultrasonic carrier signal.

In some implementations, one or more of the ultrasonic transducer module or the microphone module is configured to be placed in the person's mouth.

In some implementations, one or more of the ultrasonic transducer module or the microphone module is configured to be placed on a surface of the person's body.

In some implementations, one or more of the ultrasonic transducer module or the microphone module is integrated into a clothing article or an accessory.

In some implementations, the ultrasonic transducer module is integrated into dental equipment.

In some implementations, the microphone module is integrated into a remote electronic device.

In some implementations, the microphone module includes a contact microphone or an air microphone.

Other embodiments of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
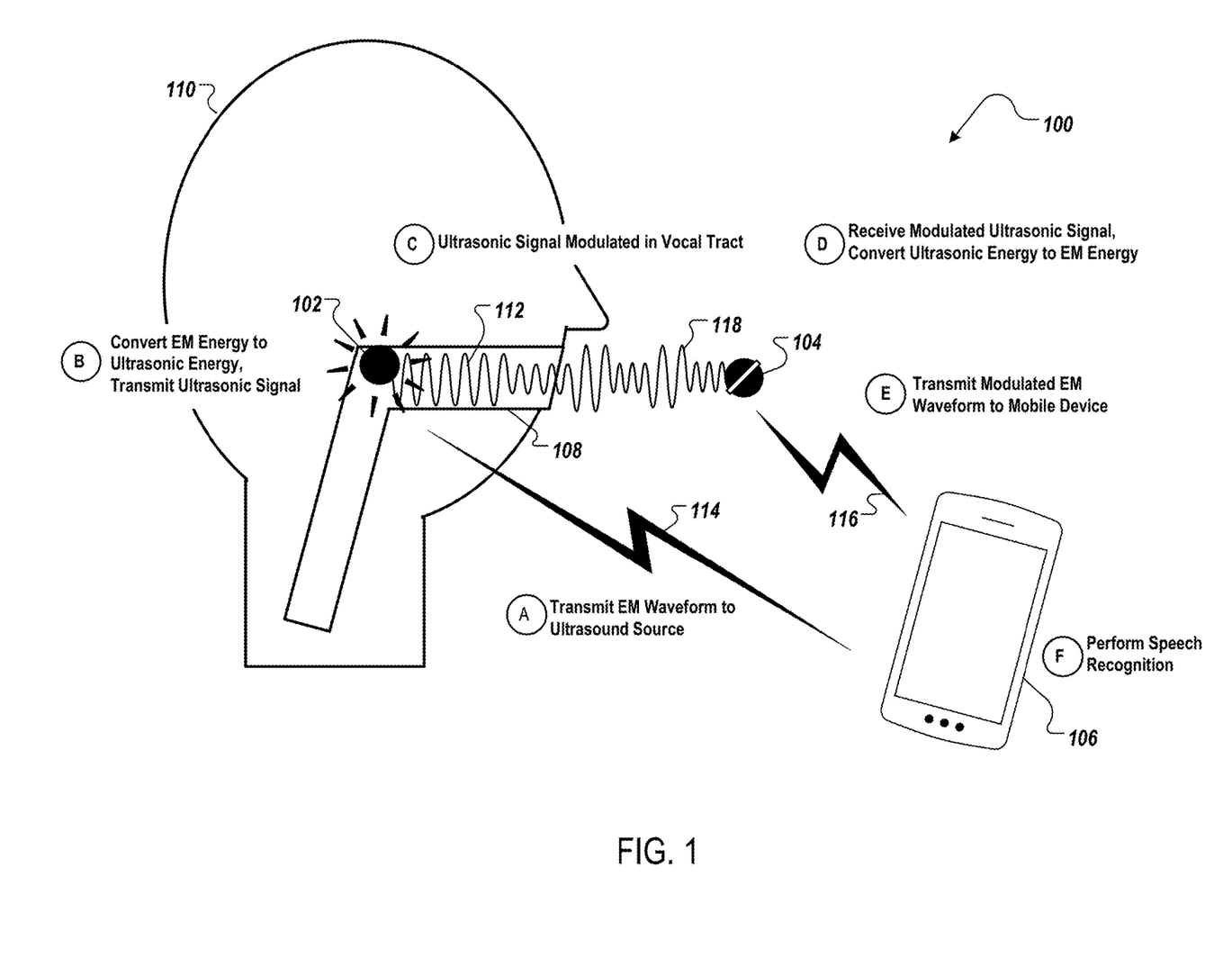
FIG. 1 illustrates an example system for ultrasonic speech recognition using an in-mouth ultrasound source and an external ultrasound microphone.

FIG. 1 illustrates an example system 100 for ultrasonic speech recognition using an ultrasonic transducer module, e.g., in-mouth ultrasound source 102, and a microphone module, e.g., external ultrasound microphone 104. The system 100 includes the ultrasound source 102, the ultrasound microphone 104, and a data processing apparatus or system, e.g., a mobile device 106.

Generally, the data processing apparatus can be a remote electronic device, such as a computer or mobile device, having appropriate data processing capabilities for generating, receiving, and analyzing an electromagnetic waveform representation of an ultrasound signal in the operative frequency range of the system.

FIG. 1 depicts operation of system 100 as six stages (A) to (F). In stage (A), the mobile device 106 transmits an electromagnetic waveform 114 to the ultrasound source 102. The characteristics of the electromagnetic waveform 114 determine the characteristics of the ultrasound produced by the ultrasound source 102. For example, the characteristics of the electromagnetic waveform 114 determine the acoustic frequency bandwidth, pulse width, pulse repetition frequency, amplitude, frequency modulation, and other characteristics of the ultrasound. The mobile device 106 can transmit the electromagnetic waveform 114 to the ultrasound source 102 via communication methods such as cellular networks, radio frequency transmission, Bluetooth, or Wi-Fi. In some implementations, the mobile device can transmit an electrical signal to the ultrasound source 102 through a wire or cable.

In system 100, the ultrasound source 102 is located inside the vocal tract 108 of a user 110. The vocal tract 108 is the cavity where the sound produced by the larynx is filtered. The vocal tract 108 includes the trachea (windpipe), oral cavity, (mouth), esophagus, and nasal cavity. Structures of the vocal tract 108 include the tongue, lips, gums, and teeth. The ultrasound source 102 can insert into the vocal tract 108, for example, when integrated into dental equipment such as a retainer, mouth guard, or braces. In some implementations, the ultrasound source 102 can insert into the vocal tract 108 as an attachment to one or more teeth, e.g., on a dental implant or tooth clip.

In stage (B), the ultrasound source 102 receives the electromagnetic waveform 114 and converts the electromagnetic energy to ultrasound energy, producing an ultrasonic carrier signal 112. The ultrasonic carrier signal 112 is above the standard frequency range of human hearing, e.g., between 20 kHz and 50 kHz, such as from 20 kHz to 30 kHz. The ultrasound source 102 transmits the ultrasonic carrier signal 112, which travels through the vocal tract 108.

In some implementations, the ultrasound source 102 can communicate with the mobile device 106 intermittently, rather than continuously. For example, the ultrasound source 102 can receive a first electromagnetic waveform 114, and transmit an ultrasonic carrier signal 112 generated from the first electromagnetic waveform 114 for a period of time. At a designated time interval, or when needed, the mobile device 106 can transmit a second electromagnetic waveform 114 to the ultrasound source 102, and the ultrasound source 102 can transmit an ultrasonic carrier signal 112 generated from the second electromagnetic waveform 114 for a period of time.

In some implementations, the ultrasound source 102 can generate and transmit the ultrasonic carrier signal 112 independently, i.e., without receiving the electromagnetic waveform 114 from the mobile device 106. For example, the ultrasound source 102 can include a processor for generating the ultrasonic carrier signal 112.

In stage (C), while the ultrasonic carrier signal 112 travels through the vocal tract 108, the user 110 may modulate his vocal tract 108 as in normal speech, with or without moving air through the voice box. The ultrasonic carrier signal 112 can interact with structures of the vocal tract 108 in one or more ways. For example, portions of the ultrasonic carrier signal 112 may reflect, refract, diffract, or scatter off of surfaces within the vocal tract 108. Additionally, portions of the ultrasonic carrier signal 112 may absorb into surfaces within the vocal tract 108.

The movement of the vocal tract 108, and the resulting interactions between the ultrasonic carrier signal 112 and surfaces within the vocal tract 108, modulates the ultrasonic carrier signal 112, resulting in a modulated ultrasonic signal 118. For example, the frequencies of the ultrasonic carrier signal 112 can be modulated by the movement of the user's 110 lips, tongue, and teeth while the user 110 forms articulations with his vocal tract 108. Articulations can include the formation of words or other vocal tract movements. For example, the user 110 may tap his tongue to the roof of his mouth, or form his mouth in a "whistling" shape. The modulated ultrasonic signal 118 travels from the vocal tract 108 to the ultrasound microphone 104.

In stage (D), the ultrasound microphone 104 receives the modulated ultrasonic signal 118. The ultrasound microphone 104 is an air microphone located outside of the vocal tract 108 of the user 110. For example, the ultrasound microphone 104 may be hand-held, or may be attached to a clothing article or to an accessory. In some cases, the ultrasound microphone 104 may receive acoustic energy in addition to the acoustic energy of the ultrasonic signal 118. The ultrasound microphone 104 can filter the received acoustic energy to remove acoustic energy at frequencies outside of an operative ultrasonic frequency band of the ultrasonic carrier signal. For example, if the user 110 speaks aloud while moving his vocal tract 108, the microphone 104 can filter out the lower-frequency acoustic energy from the user's 110 voice box. The ultrasound microphone 104 converts the ultrasound energy to electromagnetic energy, producing a modulated electromagnetic waveform 116.

In stage (E), the ultrasound microphone 104 transmits the modulated electromagnetic waveform 116 to the mobile device 106. In some implementations, the ultrasound microphone 104 and the mobile device 106 can be integrated into the same physical device. The ultrasound microphone 104 can also be integrated with an electronic device, e.g., a laptop, headset, or other device.

In stage (F), the mobile device 106 analyzes the modulated electromagnetic waveform 116 and performs speech recognition. The mobile device 106 can perform speech recognition using algorithms to classify the captured waveform into recognized mouthed articulations, such as phonemes, commands, phrases, words, sentences, or other vocal tract movements. The mobile device 106 can incorporate a machine learned method, e.g., a neural network, to recognize the mouthed articulations based on modulated electromagnetic waveforms 116.

The mobile device 106 produces an output. Producing the output can include, for example, generating a text of recognized articulations. Text of recognized words can be used in applications such as text messaging and email. Producing the output can also include generating an audio signal of the recognized articulations. Audio of recognized words can be used, for example, in applications such as telephone calls or video chat. Producing the output can also include generating data indicating a prosody of the recognized articulations. The user's 110 prosody can include characteristics such as tone, stress, rhythm, and emotional inflection.

In some examples, producing the output can include executing one or more commands in response to recognized articulations. A command can be related to the control of video or audio, for example, such as commands to "play," "stop," or "skip." The output can also be the execution of pre-programmed commands in response to non-word articulations. For example, in response to a user 110 tapping his tongue on the roof of his mouth, the mobile device 106 may execute a pre-programmed command such as playing music.

Figure 2:
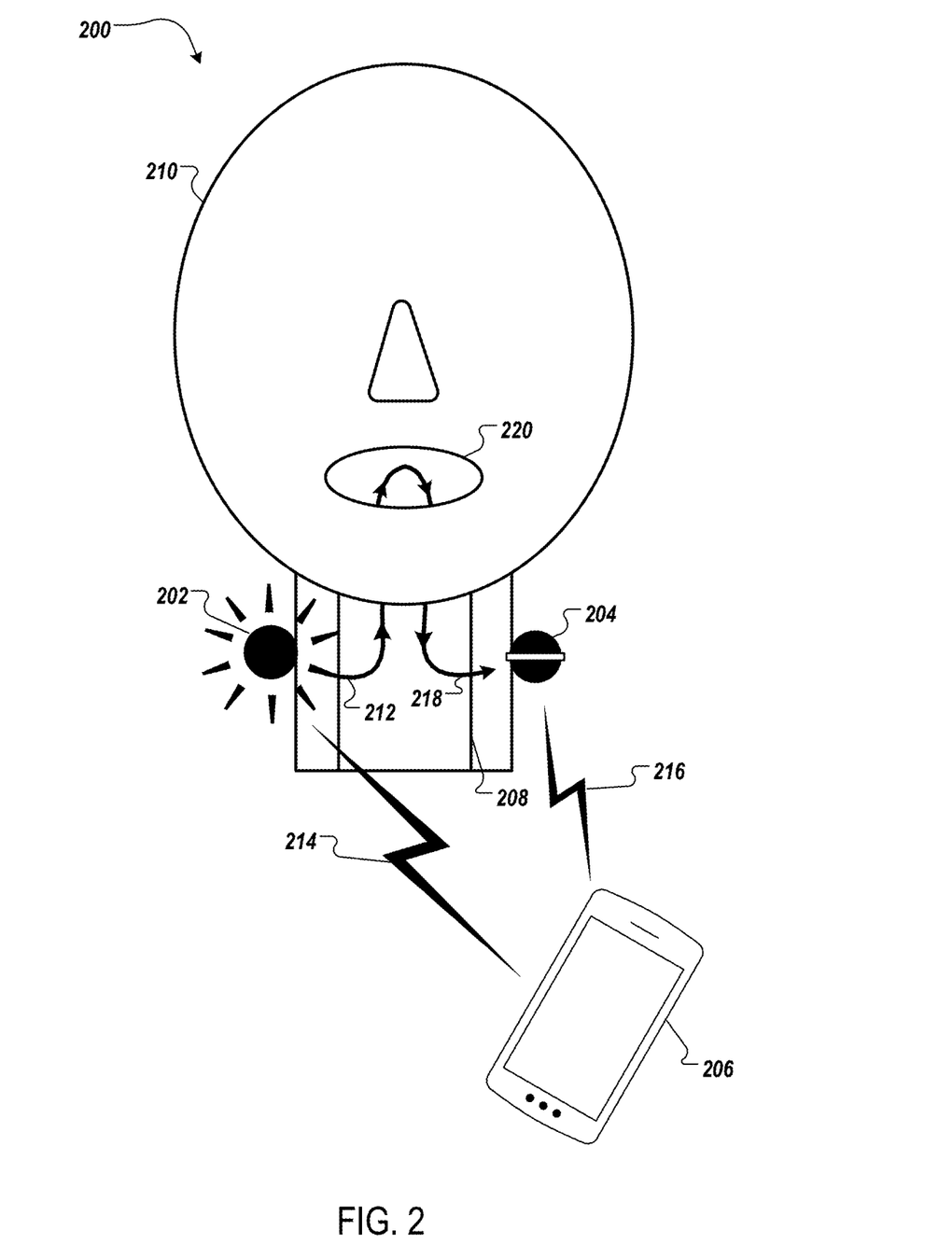
FIG. 2 illustrates an example system for ultrasonic speech recognition using an ultrasound source and an ultrasound microphone that are each located on the surface of a user's throat.

While system 100 features an ultrasound source that is located within the user's vocal tract, other implementations are possible. For example, FIG. 2 illustrates another example system 200 for ultrasonic speech recognition that includes an ultrasound source 202 and an ultrasound microphone 204 that are each on the surface of a user's throat. The operations for ultrasonic speech recognition in system 200 are similar to the operations for ultrasonic speech recognition in system 100. The system 200 includes the ultrasound source 202, the ultrasound microphone 204, and a data processing system, e.g., a mobile device 206.

In FIG. 2, the mobile device 206 transmits an electromagnetic waveform 214 to the ultrasound source 202. The ultrasound source 202 receives the electromagnetic waveform 214 and converts the electromagnetic energy to ultrasound energy, producing an ultrasonic signal 212.

The ultrasound source 202 is a contact source. A contact source can couple the signal to the user's 210 body, for example, a structure of the face or throat, to inject ultrasonic sound into a vocal tract 208. The ultrasound source 202 can be located on the surface of the user's 210 throat, for example, as an attachment to equipment, clothing, or accessories. For example, the ultrasound source 202 can be integrated into a headphone set, scarf, or a device that wraps around the user's 210 throat.

The ultrasound source 202 transmits the ultrasonic signal 212, which travels through vocal tract 208. While the ultrasonic signal 212 travels through the vocal tract 208, the user 210 may modulate his vocal tract 208 as in normal speech, or in other ways not related to the formation of words. The movement of the vocal tract 208 modulates the ultrasonic signal 212, resulting in a modulated ultrasonic signal 218. The modulated ultrasonic signal 218 returns through the vocal tract 208 to the ultrasound microphone 204.

The ultrasound microphone 204 receives the modulated ultrasonic signal 218 and converts the ultrasound energy to electromagnetic energy. The ultrasound microphone 204 is a contact microphone located on the surface of the user's 210 throat. A contact microphone senses acoustic vibrations through direct contact with a structure. The ultrasound microphone 204 can be located on the surface of the user's 210 throat using any of the methods of attachment that can be used by the ultrasound source 202. In some implementations, the ultrasound source 202 and the ultrasound microphone 204 can each attach to the same device.

The ultrasound microphone 204 transmits the modulated electromagnetic waveform 216 to the mobile device 206. The mobile device 206 analyzes the modulated electromagnetic waveform 216 and performs speech recognition on the articulations mouthed by the user.

The mobile device 206 produces an output. The output can be, for example, a text of the recognized articulations, an audio signal of the recognized articulations, or the execution of a command in response to the recognized articulations.

FIG. 1 and FIG. 2 illustrate two potential configurations of the ultrasound source and the ultrasound microphone. The ultrasound source and ultrasound microphone can be configured in many configurations. For example, the ultrasound microphone can be located inside of a vocal tract, while the ultrasound source is outside of the vocal tract. In another example, the ultrasound source and ultrasound microphone can both be located inside the user's vocal tract, or both can be located outside of the user's vocal tract. For example, the ultrasound source and ultrasound microphone both can be located in front of the user's mouth.

The ultrasound source and ultrasound microphone may each be coupled to the user's vocal tract. The ultrasound source and ultrasound microphone can be located on or near the surface of the user's face, throat, or another part of a user's body. Because ultrasonic signals propagate with minimal attenuation, the ultrasound source and/or ultrasound microphone can be located on the chest or at the extremities of the body, e.g., in a user's hand. In some implementations, the ultrasound source and ultrasound microphone can be the same physical device, i.e., an ultrasound transceiver, and can be located in any of the above mentioned locations.

Figure 3:
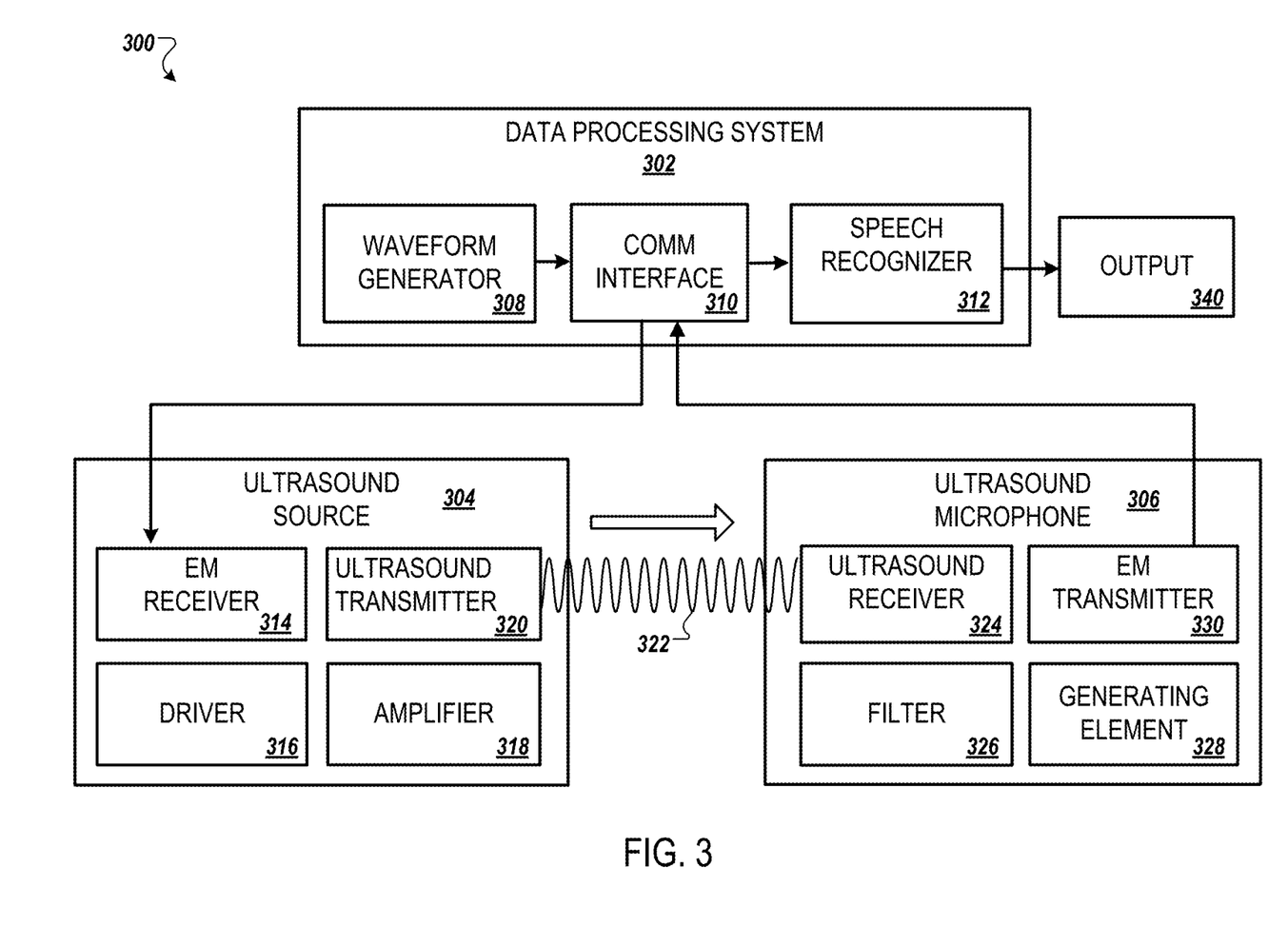
FIG. 3 illustrates an example system for ultrasonic speech recognition.

FIG. 3 illustrates an example system 300 for ultrasonic speech recognition. The system 300 includes a data processing apparatus, e.g., data processing system 302, an ultrasonic transducer module, e.g., ultrasound source 304, and a microphone module, e.g., ultrasound microphone 306.

The data processing system 302 can include a computer or mobile device, such as a smartphone or smart watch, having appropriate data processing capabilities for receiving and analyzing an ultrasonic carrier signal in the operative frequency range of the system.

The data processing system 302 includes a waveform generator 308, a communications interface 310, and a speech recognizer 312. The waveform generator 308 generates an electromagnetic waveform. The data processing system 302 transmits the electromagnetic waveform through the communications interface 310 to the ultrasound source 304.

The ultrasound source 304 can be any appropriate type of transducer capable of producing an ultrasound signal within the operative frequency band. For example, the ultrasound source 304 can be a piezoelectric transducer, electrodynamic transducer, or a capacitive transducer. The ultrasound source 304 includes an electromagnetic receiver 314, a driver 316, an amplifier 318, and an ultrasound transmitter 320.

The ultrasound source 304 receives the electromagnetic waveform through the electromagnetic receiver 314. The driver 316 converts the electromagnetic energy to ultrasound energy. For example, the driver can be a piezoelectric driver or electrodynamic driver. The amplifier 318 increases the power of the ultrasonic signal for transmission. The ultrasound transmitter 320 transmits an ultrasonic carrier signal, e.g., ultrasonic signal 322.

The ultrasonic signal 322 transmitted by the ultrasonic transmitter 320 is frequency-rich. A frequency-rich signal can include frequency modulation, pulsed operation, frequency ramps, and multi-frequency continuous waves selected for not generating audible beat frequencies. A frequency-rich signal can also be produced by multiple ultrasound sources 304 combined in a single device. The multiple ultrasound sources 304 can transmit simultaneously in order to establish a static or dynamic broadband ultrasonic signal 322. A frequency-rich ultrasonic signal 322 is desirable because a single continuous wave at a particular ultrasound frequency, when modulated by a vocal tract, does not have enough information for the data processing system 302 to reliably reconstruct speech.

The ultrasonic signal 322 travels from the ultrasound transmitter 320 of the ultrasound source 304 to the ultrasound microphone 306. The ultrasonic signal 322 is modulated by vocal tract movement.

The ultrasound microphone 306 can be any appropriate type of microphone that is capable of receiving the frequencies produced by the ultrasound source 304. Similar to the ultrasound source 304, the ultrasound microphone 306 can be, for example, piezoelectric, electrodynamic, or capacitive. The ultrasound microphone 306 can be a contact microphone, an air microphone, or an in-mouth microphone. An example ultrasound microphone 306 is a laryngophone, or throat microphone. A laryngophone uses piezoelectric materials to absorb vibrations from the user's vocal tract when located on or near the surface of the neck.

The ultrasound microphone 306 includes an ultrasound receiver 324, one or more filters 326, a generating element 328, and an electromagnetic transmitter 330. The ultrasound receiver 324 receives the ultrasonic signal 322 that has been modified by vocal tract. The one or more filters 326 filter out noise and frequencies that do not fall within the designated operating range. The one or more filters 326 can be, for example, any combination of low-pass filters, high-pass filters, and band-pass filters. The generating element 328 converts the acoustic energy to electromagnetic energy. For example, the generating element 328 can be a piezoelectric or electrodynamic element that produces a modulated electromagnetic waveform. The electromagnetic transmitter 330 transmits the modulated electromagnetic waveform to the data processing system 302.

In some implementations, the ultrasound source 304 and ultrasound microphone 306 can be the same physical device, i.e., an ultrasound transceiver. An ultrasound transceiver can alternate between transmitting and receiving ultrasonic energy. For example, an ultrasound transceiver can be similar to a voice coil, which alternates between converting electrical signals into acoustic signals, and converting acoustic signals into electrical signals.

The data processing system 302 receives the modulated electromagnetic waveform from the ultrasound microphone 306 through the communications interface 310. The speech recognizer 312 analyzes the received waveform and performs speech recognition. The speech recognizer 312 can run the waveform through one or more algorithms. For example, the speech recognizer 312 can use a standard automatic speech recognition algorithm to reconstruct text which can then be synthesized into speech. In another example, the speech recognizer 312 can use a direct speech synthesis algorithm. A direct speech synthesis algorithm uses the modulated electromagnetic waveform and training data to reconstruct the user's speech directly, without the intermediate step of translating into text.

In some implementations, the speech recognizer 312 uses a machine learned method, e.g., a neural network, to recognize articulations based on modulated electromagnetic waveforms. A neural network can be trained to translate and interpret vocal tract movements based on ultrasonic signal modulation. In some implementations, the speech recognizer can perform analysis on a cloud server.

The data processing system 302 produces an output 340. The output can be, for example, a text of the recognized articulations, an audio signal of the recognized articulations, or the execution of a command in response to the recognized articulations. The output can also be the execution of a pre-programmed command in response to a non-word articulation.

Figure 4:
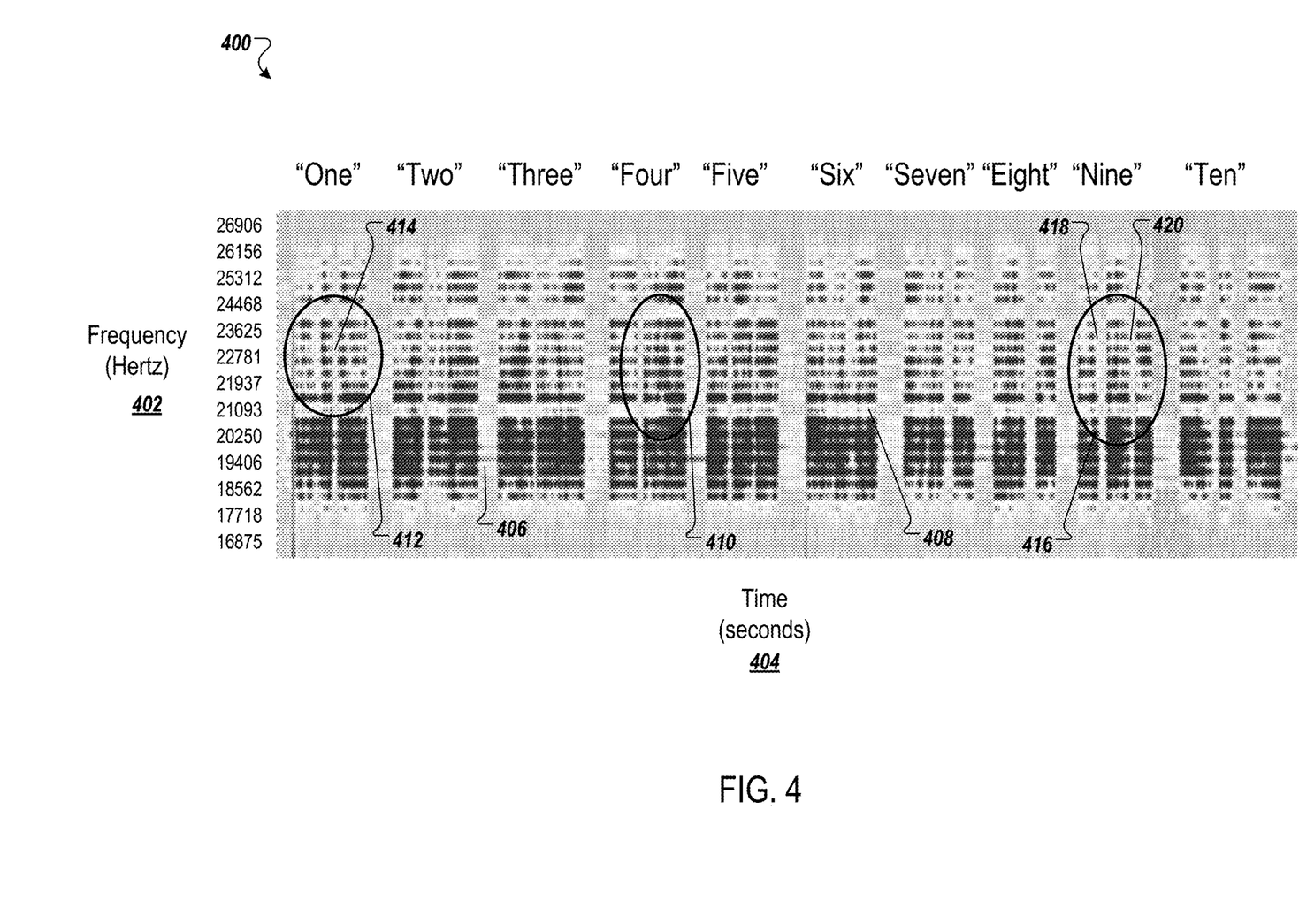
FIG. 4 shows an example spectrograph of a modulated ultrasonic signal.

FIG. 4 shows an example spectrograph 400 of a modulated ultrasonic signal. The spectrograph 400 displays frequency 402, measured in Hertz (Hz), graphed over time 404, measured in seconds.

The spectrograph 400 was produced using an ultrasonic speech device with an ultrasound source located inside a user's mouth. An ultrasound microphone was located outside of the user's mouth. The ultrasound source produced and transmitted an ultrasonic signal that included frequencies 402 ranging from 18,000 Hz to 25,000 Hz. While the ultrasound source transmitted the ultrasonic signal, the user mouthed numbers in order from "One" to "Ten."

The spectrograph includes lighter regions and darker regions. Lighter regions represent the ultrasound microphone not receiving ultrasonic energy, or receiving weak, i.e., low amplitude, ultrasonic energy. For example, lighter regions that extend across a range of frequencies 402 can be the result of the user closing his mouth at a certain time 406. The user closing his mouth can block the ultrasonic signal, or can attenuate the ultrasonic signal, reducing the portion of the ultrasonic signal that reaches the ultrasound microphone. The lighter region 406, for example, is the result of the user closing his mouth between mouthing the words "Two" and "Three."

Lighter regions that extend across a range of time 404 can be the result of the ultrasonic waveform frequency 402 characteristics. For example, the ultrasound source might not producing ultrasonic energy at certain frequencies 402. The lighter region 408, for example, is the result of the ultrasound source not producing ultrasonic energy, or producing low-amplitude ultrasonic energy, at the corresponding frequencies 402.

Darker regions of the spectrograph represent the ultrasound microphone receiving ultrasonic energy. Ultrasonic energy of higher amplitudes results in darker regions on the spectrograph. For example, darker regions that extend across a range of frequencies 402 can be the result of the user opening his mouth at a certain time 404. The user opening his mouth allows the ultrasonic signal to travel from the ultrasound source to the ultrasound microphone with little attenuation. The darker region 410, for example, is the result of the user opening his mouth while speaking the word "Four."

The data processing system can identify characteristics of mouthed articulations by analyzing patterns of spectrographs, such as the spectrograph 400, and corresponding data. For example, the word "One" includes one "N" sound, while the word "Nine" includes two "N" sounds. These characteristics are shown in regions 412 and 416. In region 412, the user mouths the word "One," with one "N" sound. The "N" sound results in a lighter region 414 in the spectrograph that extends across multiple frequencies. In region 416, the user mouths the word "Nine," with two "N" sounds. The "N" sounds result in two lighter regions 418 and 420 in the spectrograph that each extend across multiple frequencies.

The data processing system can analyze the spectrograph and corresponding data using speech recognition algorithms. In some implementations, the data processing system can use a machine-learned method, e.g., a neural network, to identify characteristics of speech. For example, the data processing system can learn to correlate spectrograph data, e.g., as shown in spectrograph 400, with the "N" sound and other verbal sounds.

Figure 5:
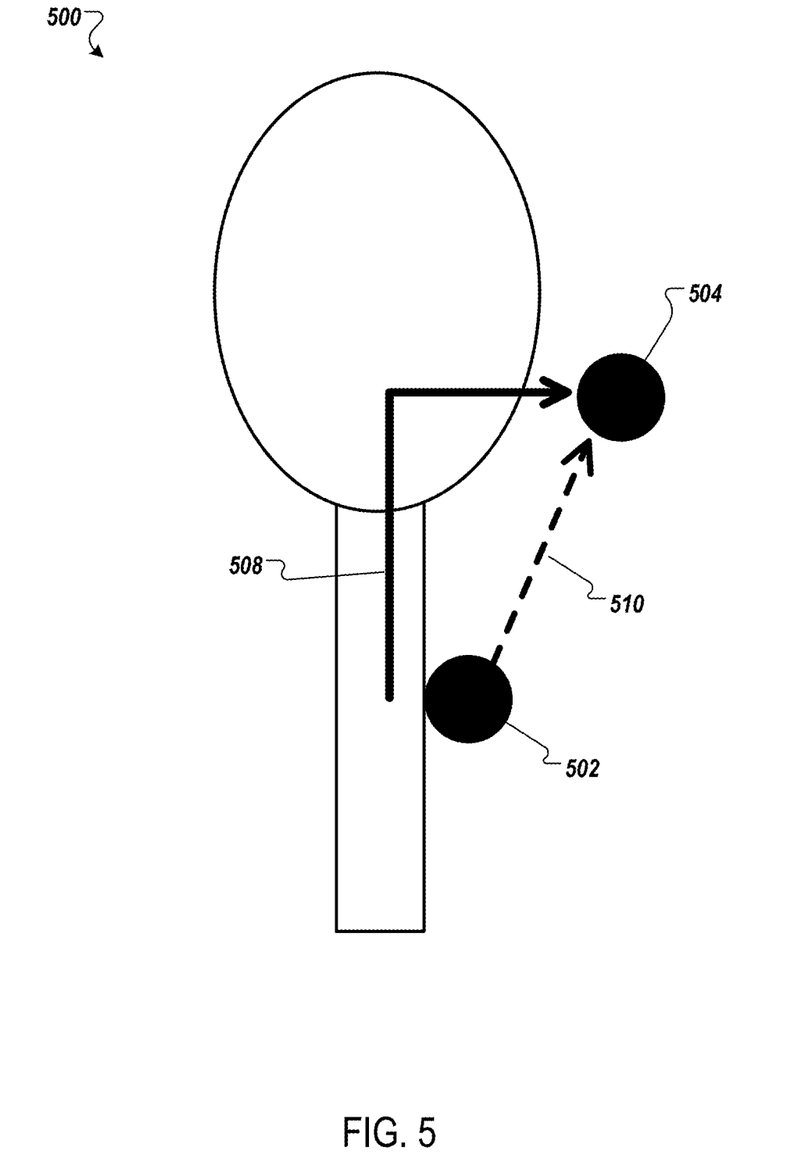
FIG. 5 illustrates an example system for reducing or eliminating cross-talk between an ultrasound source and an ultrasound microphone.

FIG. 5 illustrates an example system 500 for reducing or eliminating cross-talk between an ultrasound source 502 and an ultrasound microphone 504.

When the ultrasound source 502 transmits ultrasonic energy, the ultrasonic energy can travel to the ultrasound microphone 504 via more than one path. For example, the ultrasonic energy can travel to the ultrasound microphone 504 via the vocal tract 508. The ultrasonic energy can also travel to the ultrasound microphone 508 via a direct path 510. The ultrasonic energy received by the ultrasound microphone 504 via the direct path 510 is not modulated by the vocal tract 508. Therefore, the direct path 510 energy is not representative of vocal tract 508 movement, is not useful for performing speech recognition, and can be considered cross-talk. To improve accuracy in ultrasonic speech recognition, it is desirable to reduce or eliminate cross-talk.

In FIG. 5, the ultrasound source 502 is located on or near the surface of the user's throat. The ultrasound microphone 504 is located outside of the user's vocal tract 508. The ultrasound source 502 is a contact transducer, and injects the ultrasonic energy into the user's throat. A portion of the ultrasonic energy travels through the vocal tract 508 to the ultrasound microphone 504. A portion of the ultrasonic energy travels via the direct path 510 to the ultrasound microphone 504. Because the direct path 510 is a shorter distance compared to the vocal tract 508, the portion of the ultrasonic energy that travels via the direct path 510 arrives at the ultrasound microphone 504 before the portion of the ultrasonic energy that travels through the vocal tract 508.

To reduce or eliminate the effects of cross-talk on ultrasonic speech recognition, the ultrasonic speech device can use time-offset techniques. In some examples, a frequency of the ultrasonic carrier signal varies according to a transmit time of the ultrasonic signal. The microphone can detect the modulated ultrasonic signal by receiving acoustic energy at a receiving time. The microphone can filter the acoustic energy to remove portions of the acoustic energy having a frequency outside of a range of frequencies. The range of frequencies accords with a range of transmit times. Each of the transmit times can be approximately a time interval prior to the receiving time. The time interval can be a travel time of the ultrasonic carrier signal from the ultrasound source to the ultrasound microphone through the vocal tract.

For example, the ultrasound source 502 can transmit ultrasonic chirps. An ultrasonic chirp can include, for example, a frequency ramp from 20 kHz to 30 kHz. The ultrasound microphone 504 can include a narrow band-pass filter that follows the frequency ramp at a delayed time interval corresponding to the length of time for the ultrasonic carrier signal to travel from the ultrasound source 502 to the ultrasound microphone 504 through the vocal tract 508.

The portion of the ultrasonic carrier signal that travels via the direct path 510 arrives at the ultrasound microphone 504 early and is not within the band-pass filter frequency range. The filter removes portions of received acoustic energy outside of the frequency range. The time period during which the ultrasound microphone 504 receives and filters out acoustic energy outside of the frequency range, including direct path 510 ultrasonic energy, is a cross-talk window.

The portion of the ultrasonic energy that travels via the vocal tract 508 arrives at the ultrasound microphone 504 in alignment with the ramped band-pass filter frequency range. The portions of received acoustic energy within the frequency range, e.g., the portions of the ultrasonic carrier signal that arrive after the delayed time interval corresponding with the travel time through the vocal tract 508, pass through the band-pass filter.

The time period during which the ultrasound microphone 504 receives and processes the ultrasonic energy from the vocal tract 508 path is a listening window. The cross-talk window and listening window can be adjusted and calibrated based on the relative positions of the ultrasound source 502 and the ultrasound microphone 504. By filtering out direct path 510 ultrasonic energy, the ultrasonic speech device can reduce the effects of cross-talk and improve ultrasonic speech recognition accuracy.

Figure 6:
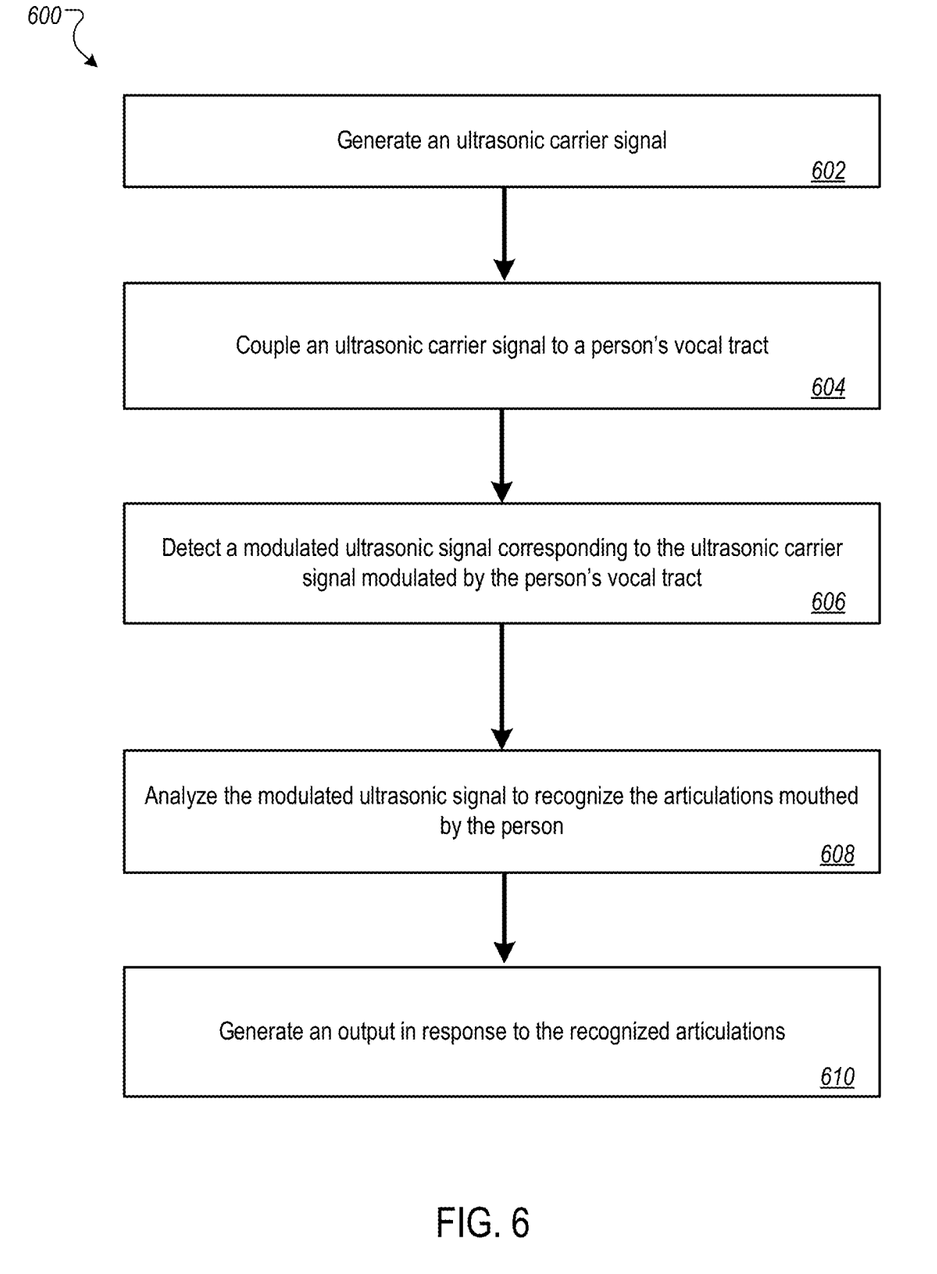
FIG. 6 is a flow diagram of an example process for ultrasonic speech recognition.

FIG. 6 is a flow diagram of an example process 600 for ultrasonic speech recognition. Briefly, the process includes generating an ultrasonic signal (602), coupling the ultrasonic signal to a person's vocal tract (604), detecting a modulated ultrasonic signal (606), analyzing the modulated ultrasonic signal to recognize articulations (608), and generating an output in response to the recognized articulations (610).

In more detail, the process 600 includes generating an ultrasonic carrier signal (602). The ultrasonic signal is above the standard frequency range of human hearing, e.g., between 20 kHz and 30 kHz.

The process 600 includes coupling an ultrasonic carrier signal to a person's vocal tract (604). The ultrasound source can couple the ultrasonic carrier signal to a user's vocal tract, for example, a structure of the user's face or throat, to inject ultrasonic sound into the vocal tract.

The process 600 includes detecting a modulated ultrasonic signal corresponding to the ultrasonic carrier signal modulated by the person's vocal tract (606). The movement of the vocal tract modulates the ultrasonic signal, resulting in a modulated ultrasonic signal. For example, the frequencies of the ultrasonic signal can be modulated by the movement of the user's lips, tongue, and teeth while the user forms articulations with his vocal tract.

The process 600 includes analyzing the modulated ultrasonic signal to recognize the articulations mouthed by the person (608). A speech recognizer analyzes the received waveform and performs speech recognition. The speech recognizer can run the modulated ultrasonic signal through one or more algorithms. The speech recognizer can use a standard automatic speech recognition algorithm to reconstruct text which can then be synthesized into speech. The speech recognizer can also use a direct speech synthesis algorithm, which uses the input ultrasonic signal and training data to reconstruct the user's speech directly without the intermediate step of translating into text. In some implementations, the speech recognizer uses a machine learned method, e.g., a neural network, to recognize articulations based on modulated waveforms. A neural network can be trained to translate and understand vocal tract movements based on signal modulation.

The process 600 includes generating an output in response to the recognized articulations (610). The output can be a text of recognized words, an audio signal of the recognized words, or the execution of a command in response to the recognized words. The output can also be the execution of a pre-programmed command in response to a non-word articulation.

Figure 7:
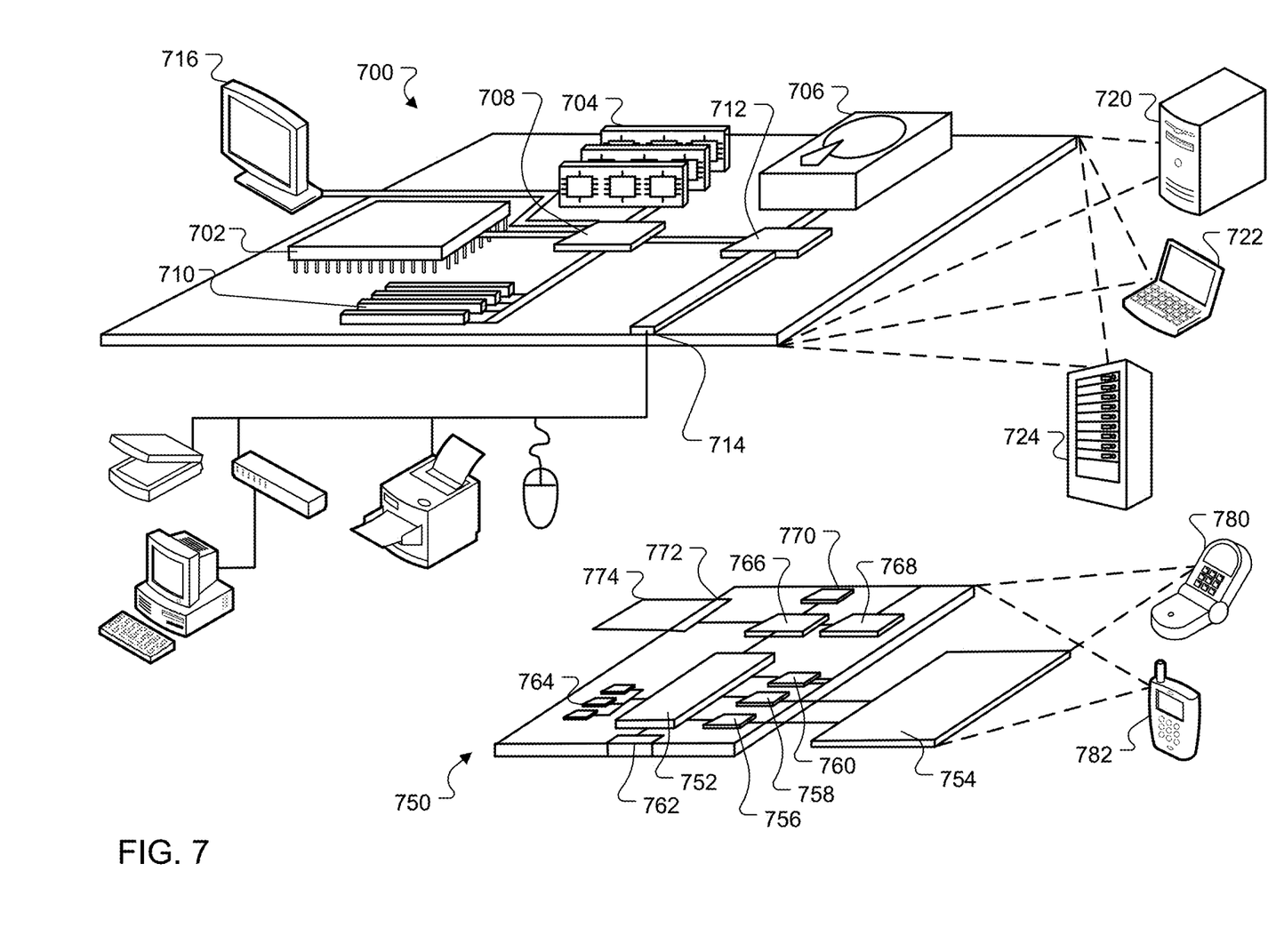
FIG. 7 shows an example of a computing device and a mobile computing device that can be used to implement the techniques described here.

FIG. 7 shows an example of a computing device 700 and a mobile computing device 750 that can be used to implement the techniques described here. The computing device 700 is intended to represent various forms of digital computers, such as laptops, desktops, workstations, personal digital assistants, servers, blade servers, mainframes, and other appropriate computers. The mobile computing device 750 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 700 includes a processor 702, a memory 704, a storage device 706, a high-speed interface 708 connecting to the memory 704 and multiple high-speed expansion ports 710, and a low-speed interface 712 connecting to a low-speed expansion port 714 and the storage device 706. Each of the processor 702, the memory 704, the storage device 706, the high-speed interface 708, the high-speed expansion ports 710, and the low-speed interface 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as a display 716 coupled to the high-speed interface 708. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 704 stores information within the computing device 700. In some implementations, the memory 704 is a volatile memory unit or units. In some implementations, the memory 704 is a non-volatile memory unit or units. The memory 704 may also be another form of computer-readable medium, such as a magnetic or optical disk.

The storage device 706 is capable of providing mass storage for the computing device 700. In some implementations, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 702), perform one or more methods, such as those described above. The instructions can also be stored by one or more storage devices such as computer- or machine-readable mediums (for example, the memory 704, the storage device 706, or memory on the processor 702).

The high-speed interface 708 manages bandwidth-intensive operations for the computing device 700, while the low-speed interface 712 manages lower bandwidth-intensive operations. Such allocation of functions is an example only. In some implementations, the high-speed interface 708 is coupled to the memory 704, the display 716 (e.g., through a graphics processor or accelerator), and to the high-speed expansion ports 710, which may accept various expansion cards (not shown). In the implementation, the low-speed interface 712 is coupled to the storage device 706 and the low-speed expansion port 714. The low-speed expansion port 714, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. In addition, it may be implemented in a personal computer such as a laptop computer 722. It may also be implemented as part of a rack server system 724. Alternatively, components from the computing device 700 may be combined with other components in a mobile device (not shown), such as a mobile computing device 750. Each of such devices may contain one or more of the computing device 700 and the mobile computing device 750, and an entire system may be made up of multiple computing devices communicating with each other.

The mobile computing device 750 includes a processor 752, a memory 764, an input/output device such as a display 754, a communication interface 766, and a transceiver 768, among other components. The mobile computing device 750 may also be provided with a storage device, such as a micro-drive or other device, to provide additional storage. Each of the processor 752, the memory 764, the display 754, the communication interface 766, and the transceiver 768, are interconnected using various buses, and several of the components may be mounted on a common motherboard or in other manners as appropriate.

The processor 752 can execute instructions within the mobile computing device 750, including instructions stored in the memory 764. The processor 752 may be implemented as a chipset of chips that include separate and multiple analog and digital processors. The processor 752 may provide, for example, for coordination of the other components of the mobile computing device 750, such as control of user interfaces, applications run by the mobile computing device 750, and wireless communication by the mobile computing device 750.

The processor 752 may communicate with a user through a control interface 758 and a display interface 756 coupled to the display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may provide communication with the processor 752, so as to enable near area communication of the mobile computing device 750 with other devices. The external interface 762 may provide, for example, for wired communication in some implementations, or for wireless communication in other implementations, and multiple interfaces may also be used.

The memory 764 stores information within the mobile computing device 750. The memory 764 can be implemented as one or more of a computer-readable medium or media, a volatile memory unit or units, or a non-volatile memory unit or units. An expansion memory 774 may also be provided and connected to the mobile computing device 750 through an expansion interface 772, which may include, for example, a SIMM (Single In Line Memory Module) card interface. The expansion memory 774 may provide extra storage space for the mobile computing device 750, or may also store applications or other information for the mobile computing device 750. Specifically, the expansion memory 774 may include instructions to carry out or supplement the processes described above, and may include secure information also. Thus, for example, the expansion memory 774 may be provide as a security module for the mobile computing device 750, and may be programmed with instructions that permit secure use of the mobile computing device 750. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. The instructions, when executed by one or more processing devices (for example, processor 752), perform one or more methods, such as those described above. The instructions can also be stored by one or more storage devices, such as one or more computer- or machine-readable mediums (for example, the memory 764, the expansion memory 774, or memory on the processor 752). In some implementations, the instructions can be received in a propagated signal, for example, over the transceiver 768 or the external interface 762.

The mobile computing device 750 may communicate wirelessly through the communication interface 766, which may include digital signal processing circuitry where necessary. The communication interface 766 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 768 using a radio-frequency. In addition, short-range communication may occur, such as using a Bluetooth, WiFi, or other such transceiver (not shown). In addition, a GPS (Global Positioning System) receiver module 770 may provide additional navigation- and location-related wireless data to the mobile computing device 750, which may be used as appropriate by applications running on the mobile computing device 750.

The mobile computing device 750 may also communicate audibly using an audio codec 760, which may receive spoken information from a user and convert it to usable digital information. The audio codec 760 may likewise generate audible sound for a user, such as through a speaker, e.g., in a handset of the mobile computing device 750. Such sound may include sound from voice telephone calls, may include recorded sound (e.g., voice messages, music files, etc.) and may also include sound generated by applications operating on the mobile computing device 750.

The mobile computing device 750 may be implemented in a number of different forms, as shown in the figure. For example, it may be implemented as a cellular telephone 780. It may also be implemented as part of a smart-phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A method, comprising:
   generating, by an ultrasonic transducer, an ultrasonic carrier signal;
   coupling, by the ultrasonic transducer, the ultrasonic carrier signal to a person's vocal tract, wherein a frequency of the ultrasonic carrier signal varies according to a transmit time of the ultrasonic carrier signal;
   detecting, by a microphone, a modulated ultrasonic signal, the modulated ultrasonic signal corresponding to the ultrasonic carrier signal modulated by the person's vocal tract to comprise information about articulations mouthed by the person, wherein detecting the modulated ultrasonic signal comprises:
   receiving acoustic energy at a receiving time; and
   filtering the acoustic energy to remove portions of the acoustic energy having a frequency outside of a first range of frequencies, the first range of frequencies varying with a corresponding range of transmit times, each of the transmit times occurring during a time window that precedes the receiving time by a first time interval corresponding to a travel time of the ultrasonic carrier signal from the ultrasonic transducer to the microphone through the vocal tact;
   analyzing, using a data processing apparatus, the modulated ultrasonic signal to recognize the articulations mouthed by the person from the information in the modulated ultrasonic signal; and
   generating, using the data processing apparatus, an output in response to the recognized articulations.

2. The method of claim 1, wherein generating the ultrasonic carrier signal comprises:
   receiving, from an electronic device, an electromagnetic waveform; and
   converting the electromagnetic waveform to the ultrasonic carrier signal.

3. The method of claim 1, wherein analyzing the modulated ultrasonic signal comprises performing speech recognition on the articulations mouthed by the person, wherein the articulations mouthed by the person comprise one or more of a phoneme, word, command, phrase, sentence, or non-word articulation.

4. The method of claim 1, wherein detecting the modulated ultrasonic signal comprises:
filtering the received acoustic energy to remove portions of the received acoustic energy at frequencies outside of an operative frequency band of the ultrasonic carrier signal.

5. The method of claim 1, wherein generating the output comprises generating a text of the recognized articulations or an audio signal of the recognized articulations.

6. The method of claim 1, wherein generating the output comprises generating output data indicating a prosody of the recognized articulations or executing a command in response to the recognized articulations.

7. The method of claim 1, wherein detecting the modulated ultrasonic signal comprises sensing acoustic vibrations of a surface of the person's body.

8. A system, comprising:
an ultrasonic transducer module configured to generate an ultrasonic carrier signal and couple the ultrasonic carrier signal to a person's vocal tract, wherein a frequency of the ultrasonic carrier signal varies according to a transmit time of the ultrasonic carrier signal;
a microphone module configured to be coupled to the person's vocal tract to detect a modulated ultrasonic signal, the modulated ultrasonic signal corresponding to the ultrasonic carrier signal modulated by the person's vocal tract to comprise information about articulations mouthed by the person, wherein detecting the modulated ultrasonic signal comprises:
receiving acoustic energy at a receiving time; and
filtering the acoustic energy to remove portions of the acoustic energy having a frequency outside of a first range of frequencies, the first range of frequencies varying with a corresponding range of transmit times, each of the transmit times occurring during a time window that precedes the receiving time by a first time interval corresponding to a travel time of the ultrasonic carrier signal from the ultrasonic transducer module to the microphone module through the vocal tract; and
a data processing apparatus in communication with the microphone module programmed to analyze the modulated ultrasonic signal to recognize the articulations mouthed by the person from the information in the modulated ultrasonic signal and generate an output in response to the recognized articulations.

9. The system of claim 8, wherein detecting the modulated ultrasonic signal comprises:
filtering the received acoustic energy to remove portions of the received acoustic energy at frequencies outside of an operative frequency band of the ultrasonic carrier signal.

10. The system of claim 8, wherein the ultrasonic transducer module is configured to be placed in the person's mouth.

11. The system of claim 8, wherein the ultrasonic transducer module is configured to be placed on a surface of the person's body.

12. The system of claim 8, wherein one or more of the ultrasonic transducer module or the microphone module is integrated into a clothing article or an accessory.

13. The system of claim 8, wherein the ultrasonic transducer module is integrated into dental equipment.

14. The system of claim 8, wherein the microphone module is configured to contact a surface of the person's neck to detect the modulated ultrasonic signal.

15. The system of claim 8, wherein generating the ultrasonic carrier signal comprises:
receiving, by the ultrasonic transducer module and from an electronic device, an electromagnetic waveform; and
converting the electromagnetic waveform to the ultrasonic carrier signal.

16. The system of claim 8, wherein analyzing the modulated ultrasonic signal comprises performing speech recognition on the articulations mouthed by the person.

17. The system of claim 8, wherein the microphone module is configured to contact a surface of the person's face to detect the modulated ultrasonic signal.

18. The system of claim 8, wherein detecting the modulated ultrasonic signal comprises sensing acoustic vibrations of a surface of the person's body.

* * * * *

UNITED STATES PATENT AND TRADEMARK OFFICE
CERTIFICATE OF CORRECTION

PATENT NO. : 11,323,800 B2
APPLICATION NO. : 16/842241
DATED : May 3, 2022
INVENTOR(S) : Hunt It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 25 days.

Signed and Sealed this
Thirteenth Day of December, 2022

Katherine Kelly Vidal
*Director of the United States Patent and Trademark Office*